(12) United States Patent
Yoshino et al.

(10) Patent No.: US 10,929,521 B2
(45) Date of Patent: Feb. 23, 2021

(54) IMAGE FORMING APPARATUS

(71) Applicant: CANON KABUSHIKI KAISHA, Tokyo (JP)

(72) Inventors: Daiju Yoshino, Toride (JP); Shigeharu Kurita, Abiko (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/577,057

(22) Filed: Sep. 20, 2019

(65) Prior Publication Data

US 2020/0012775 A1    Jan. 9, 2020

Related U.S. Application Data

(63) Continuation of application No. PCT/JP2018/014652, filed on Mar. 30, 2018.

(30) Foreign Application Priority Data

Mar. 30, 2017 (JP) .............................. JP2017-068661
Mar. 30, 2017 (JP) .............................. JP2017-068662

(51) Int. Cl.
*G06F 3/12* (2006.01)
*G06F 21/35* (2013.01)
*G03G 21/18* (2006.01)
*G06F 21/60* (2013.01)
*H04B 5/00* (2006.01)
*H04N 1/00* (2006.01)

(52) U.S. Cl.
CPC ......... *G06F 21/35* (2013.01); *G03G 21/1882* (2013.01); *G06F 21/608* (2013.01); *H04B 5/0031* (2013.01); *H04N 1/00307* (2013.01)

(58) Field of Classification Search
CPC ... G06F 21/35; G06F 21/608; G03G 21/1882; H04B 5/0031; H04N 1/00307
See application file for complete search history.

(56) References Cited

U.S. PATENT DOCUMENTS 8,004,699 B2    8/2011    Okada
8,736,862 B2    5/2014    Katsuyama et al.
(Continued)

FOREIGN PATENT DOCUMENTS

JP    2008061072 A    3/2008
JP    2009288256 A    12/2009
(Continued)

OTHER PUBLICATIONS

International Search Report issued in Parent International Application PCT/JP2018-014652 dated May 29, 2018.

*Primary Examiner* — Moustapha Diaby
(74) *Attorney, Agent, or Firm* — Venable LLP

(57) ABSTRACT

An authentication operation of a communication device is facilitated without making an outer appearance of an image forming apparatus complicated. An image forming apparatus 1 includes an image reading portion 41 for reading an original image, an image forming portion 44 for forming the image on a recording material, communication devices 32 and 33 capable of communication with a storing device 52 for storing information through rear-range wireless communication, and a mounting portion 23 to which the communication devices are mounted, and the mounting portion is provided between the image reading portion and the image forming portion.

16 Claims, 12 Drawing Sheets

(56) References Cited

U.S. PATENT DOCUMENTS

| | | | |
|---|---|---|---|
| 9,089,064 B2 | 7/2015 | Katsuyama et al. | |
| 2008/0055675 A1 | 3/2008 | Okada | |
| 2011/0181903 A1 | 7/2011 | Katsuyama et al. | |
| 2011/0286028 A1* | 11/2011 | Kinouchi | H04N 1/00307 358/1.14 |
| 2014/0233162 A1 | 8/2014 | Katsuyama et al. | |

FOREIGN PATENT DOCUMENTS

| | | |
|---|---|---|
| JP | 2011154075 A | 8/2011 |
| JP | 2013030043 A | 2/2013 |
| JP | 2016189060 A | 11/2016 |
| JP | 2016197201 A | 11/2016 |

* cited by examiner

IMAGE FORMING APPARATUS

TECHNICAL FIELD

The present invention relates to an image forming apparatus including a communication device capable of communication through near-range wireless communication.

BACKGROUND ART

In recent years, in an image forming apparatus such as a copying machine, a multi-function machine, a printer, a facsimile, or the like, a communication device for establishing communication with an IC card and information terminal devices such as a smartphone and a tablet is provided. Japanese Laid-Open Application 2011-154075 discloses an image forming apparatus in which an authentication device for performing user authentication by the IC card or finger print is provided adjacent to an operating panel.

SUMMARY OF THE INVENTION

Problem to be Solved by the Invention

When at a position of the authentication device of Japanese Laid-Open Patent Application 2011-154075, the communication device for establishing the communication with the information terminal device is separately provided, there is a liability that an operation unexpected by a user occurs in the image forming apparatus due to contact, with the operating panel, of the information terminal device held over the communication device or finger (s) of the user holding the communication device.

Therefore, the present invention aims at providing an image forming apparatus in which the contact, with the operating portioning panel, of the information terminal device or the finger(s) of the user holding the information terminal device is suppressed by providing the communication device for establishing the communication with the information terminal device at a position different from a position of the authentication device for the IC card.

Means for Solving the Problem

In order to solve the above-described problem, an image forming apparatus according to an embodiment of the present invention is an image forming apparatus in which an image forming portion for a recording material is provided in a main assembly, the image forming apparatus comprising: an operating portion, provided on a front side of the main assembly, for receiving input from a user; a first target display portion which is provided adjacent to the operating portion and which is a target over which an IC card storing user information is to be held by the user; an IC card reader for establishing wireless communication with the IC card held over the first target display portion; a second target display portion which is provided at a position distant from the operating portion more than the first target display portion is and which is a target over which an information terminal device is to be held by the user; and a communication device for establishing wireless communication with the information terminal device held over the second target display portion.

Effect of the Invention

According to the present invention, contact, with the operating portion of the image forming apparatus, of the information terminal device held over the operating portion by the user is suppressed.

EMBODIMENTS FOR CARRYING OUT THE INVENTION

In the following, with reference to the attached drawing, embodiments for carrying out the present invention will be described.

Embodiment 1

(Image Forming Apparatus)

Figure 1:
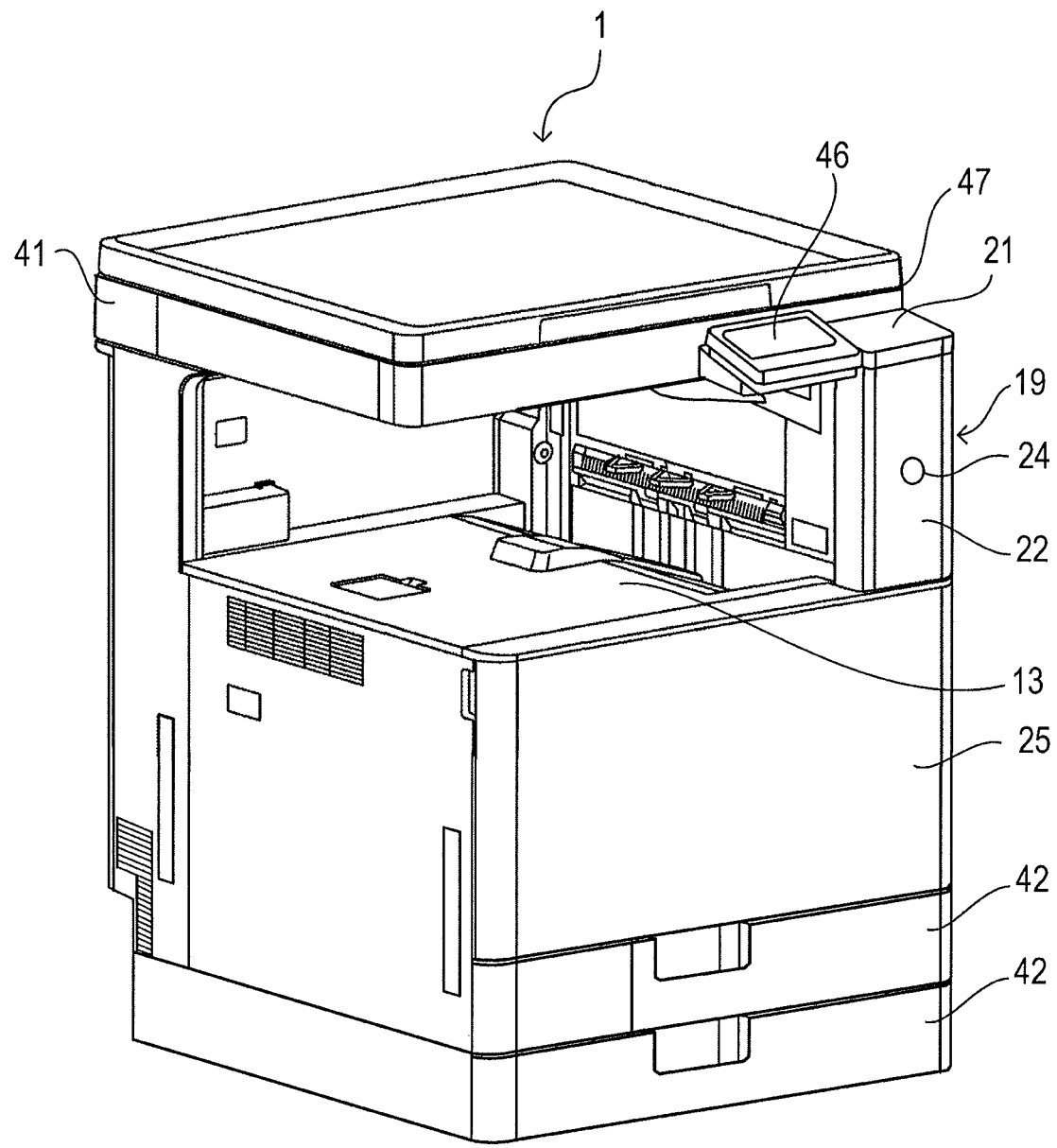
FIG. 1 is a perspective view of an image forming apparatus of an embodiment 1.
Figure 2:
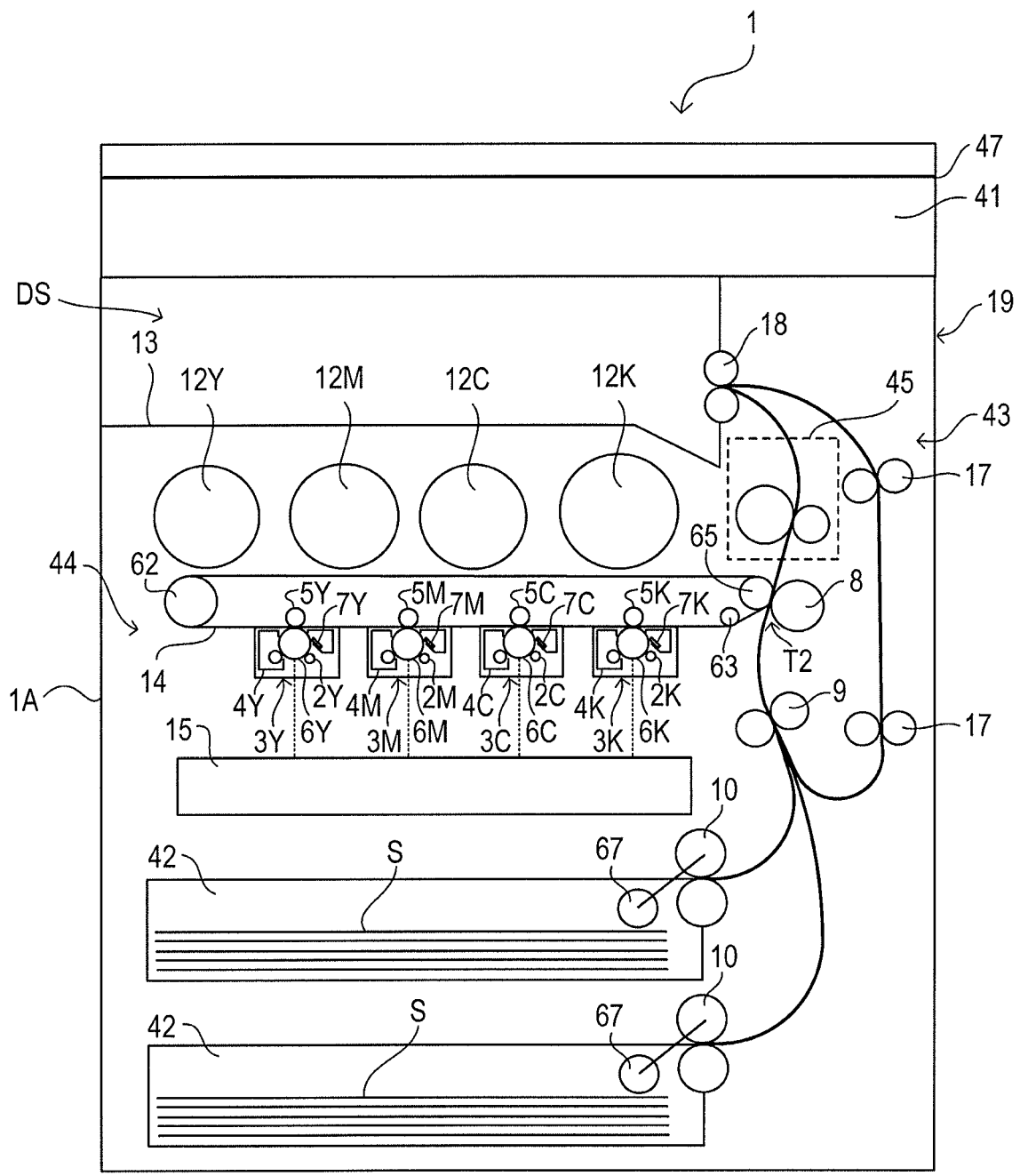
FIG. 2 is a sectional view of the image forming apparatus of the embodiment 1.

FIG. 1 is a perspective view of an image forming apparatus 1 of an embodiment 1. FIG. 2 is a sectional view of the image forming apparatus of the embodiment 1. The image forming apparatus 1 is a full-color multi-function machine provided with an image reading portion 41. The image forming apparatus 1 is, as shown in FIG. 2, of a tandem type in which process cartridges (hereinafter referred to as cartridges) 3Y, 3M, 3C and 3K are provided along an intermediary transfer belt 14. The image forming apparatus 1 is an electrophotographic image forming apparatus for forming an image on a recording material (medium) S with use of an electrophotographic type, but is not limited thereto. The image forming apparatus 1 may also be an ink jet printer. The recording material S is a transfer material on which the image is formed by the image forming apparatus 1, and for example, paper, an OHP sheet, a cloth and the like. Hereinafter, the recording material S is referred to as a sheet S. The image forming apparatus 1 includes an image reading portion 41, a feeding cassette (sheet supplying portion) 42, a sheet feeding portion 43, an image forming portion 44, a fixing portion 45 and an operating portion 46.

The image forming portion 44 includes the four cartridges 3Y, 3M, 3C and 3K. The cartridges 3Y, 3M, 3C and 3K are mounted so as to be mountable in and dismountable from a main assembly 1A of the image forming apparatus 1. The cartridge 3Y forms a yellow image with use of yellow toner. The cartridge 3M forms a magenta image with use of magenta toner. The cartridge 3C forms a cyan image with use of cyan toner. The cartridge 3K forms a black image with use of black toner. Suffixes Y, M, C and K of reference symbols represent yellow, magenta, cyan and black, respectively. In the following description, in the case where there is no particular need, the suffixes Y, M, C and K are omitted in some instances. The four cartridges 3 have the same structure except for colors of developers (toners).

The cartridge 3 includes a photosensitive drum 6 as a photosensitive member. Around the photosensitive drum 6, a charging device 2, an exposure device 15, a developing device 4, a primary transfer member 5 and a cleaning device 7 are provided. The photosensitive drum 6, the charging device 2, the developing device 4 and the cleaning device 7 constitute the cartridge 3 as a unit. Above the photosensitive drum 6, an endless intermediary transfer belt (intermediary transfer member) 14 is provided. Above the intermediary transfer belt 14, a toner bottle 12 which is a toner accommodating container for accommodating the toner as the developer is provided. The toner bottle 12 is mounted so as to be mountable in and dismountable from the main assembly 1A of the image forming apparatus 1. The toner bottle 12 supplies the toner toward the developing device 4.

On a front side of the image forming apparatus 1, a front door 25 is provided as an openable member which is openable. The front door 25 is opened and closed by a user when the cartridge 3 including the photosensitive drum 6 or the toner bottle 12 is exchanged.

The intermediary transfer belt 14 is stretched by a driving roller 62 and two follower rollers 63 and 65. The primary transfer member 5 is disposed opposed to the photosensitive drum 6 through the intermediary transfer belt 14. The primary transfer member 5 transfers the toner image, on the photosensitive drum 6, onto the intermediary transfer belt 14. A secondary transfer roller (secondary transfer member) 8 is provided opposed to the follower roller 65 through the intermediary transfer belt 14 and forms a secondary transfer portion T2.

At a lower portion of the image forming apparatus 1, the feeding cassette 42 in which the sheets S are accommodated is disposed. The feeding cassette 42 is mounted in the main assembly 1 of the image forming apparatus 1 so as to be pullable toward the front side. The sheets S are fed one by one from the feeding cassette 42 by a pick-up roller 67 and a feeding roller 10. The sheet S is conveyed toward a secondary transfer portion T2 by a registration roller 9. The fixing portion 45 is disposed on a side downstream of the secondary transfer roller 8 with respect to a feeding direction of the sheet S. The fixing portion 45 is provided in a sheet conveying portion 43 with respect to a vertical direction. Between the image forming portion 44 and the image reading portion 41, a vertical path portion 19 is provided. A downstream portion of the sheet conveying portion 43 is accommodated in the vertical path portion 19. The sheet conveying portion 43 includes the feeding roller 10, the registration roller 9, the secondary transfer roller 8, the fixing portion 45, a discharging roller 18 and a reverse conveying roller 17. The sheet S is conveyed above in the vertical direction in the sheet conveying portion 43 from the secondary transfer roller 8 toward the discharging roller 18 through the fixing portion 45. With respect to the feeding direction of the sheet S, on a side downstream of the fixing portion 45, a discharge tray 13 for stacking the sheets S on which images are formed is provided. The sheets S are discharged onto the discharge tray 13 by the discharging roller 18.

The discharge tray 13 is disposed in a discharge space DS formed between the image forming portion 44 and the image reading portion 41. The discharge space DS is provided adjacent to the vertical path portion 19. The sheet S on which the images formed is discharged into the discharge space DS by the discharging roller (discharging means) 18 provided in the vertical path portion 19. The image forming apparatus is of a so-called in-body discharge type in which the sheet S on which the image is formed is discharged into the discharge space DS formed between the image forming portion 44 and the image reading portion 41.

(Image Forming Process)

Next, an image forming process of the image forming apparatus 1 will be described. Image forming processes in the four cartridges 3 are the same, and therefore, the image forming process in the yellow cartridge 3Y will be described. Description of the image forming processes in the magenta cartridge 3M, the cyan cartridge 3C and the black cartridge 3K will be omitted.

The charging device 2Y electrically charges a surface of the photosensitive drum 6Y uniformly. The exposure device 15 emits a light beam, modulated in accordance with image information of a yellow component, toward the uniformly charged surface of the photosensitive drum 6Y, and forms an electrostatic latent image on the photosensitive drum 6Y. The developing device 4Y develops the electrostatic latent image into a yellow toner image with yellow toner (developer) supplied from the toner bottle 12Y. To the primary transfer member 5y, a primary transfer bias is applied from an electric substrate (not shown). The primary transfer member 5Y primary-transfers the yellow toner image, on the photosensitive drum 6Y, onto the intermediary transfer belt 14. The toner remaining on the photosensitive drum 6Y after the primary transfer is removed by the cleaning device 7Y.

In a similar manner, the magenta toner image formed by the magenta cartridge 3M is transferred superposedly onto the yellow toner image on the intermediary transfer belt 14 with accuracy. Then, the cyan toner image and the black toner image are successively transferred superposedly onto the magenta toner image on the intermediary transfer belt 14. As a result, the four color toner images are superposed on each other on the intermediary transfer belt 14.

The sheets S accommodated in the feeding cassette 42 are fed one by one by the pick-up roller 67 and the feeding roller 10 toward the registration roller 9. The sheet S is conveyed toward the secondary transfer portion T2 by being timed to the toner images on the intermediary transfer belt 14 by the registration roller 9. The toner images on the intermediary transfer belt 14 are collectively secondary-transferred onto the sheet S by the secondary transfer roller 8. The sheet S on which the toner images are transferred is conveyed to the fixing portion 45. The fixing portion 45 fixes the toner images on the sheet S by heating and pressing the sheet S. By this, the four color toners are melted and mixed, so that a full-color image is formed on the sheet S. The sheet S on which the image is formed is discharged onto the discharge tray 13 by the discharging roller 18.

The sheet conveying portion 43 includes a reversing unit for reversing the sheet S in the case where the images are formed on double (both) surfaces (sides) of the sheet S. The reversing unit includes the reverse conveying roller 17. In the case where the images are formed on the double surfaces of the sheet S, the discharging roller 18 reverses the sheet S during discharge of the sheet S and feeds the sheet S to the reverse conveying roller 17. The sheet S turned upside down (reversed) is conveyed again to the secondary transfer portion T2 by the reverse conveying roller 17. At the secondary transfer portion T2, the toner image is transferred onto the back surface of the sheet S, and the toner image is fixed on the sheet S by the fixing portion 45. The sheet S on which the images are formed on the both surfaces is discharged onto the discharge tray 13 by the discharging roller 18.

(Image Reading Portion)

Above the main assembly 1A of the image forming apparatus 1, the image reading portion (flat head scanner) 41 is disposed through the vertical path portion 19. The image reading portion 41 optically reads an image on a lower surface of an original placed on an original reading surface (glass plate) 47 and converts the image into the image data.

(Operating Portion)

The image forming apparatus 1 is provided with the operating portion 46 for permitting a user to input information or an instruction and to operate the image forming apparatus 1. The operating portion 46 is provided with a touch panel (input means, display means) which displays an input area displaying items of the information or the instruction to be inputted and to which the information is inputted by touch of the input area by the user. The touch panel is capacitive touch panel. However, the touch panel may also be a touch panel of a resistive film type (pressure-sensitive type). An upper surface 48 of the operating portion 46 is disposed at a position at the substantially same height as the original reading surface 47 of the image reading portion 41 or lower than the original reading surface 47. The operating portion 46 is disposed on the front side of the main assembly 1A. The operating portion 46 is disposed so that the upper surface 48 of the operating portion 46 is not more than a height of the original reading surface 47 so as not to prevent an access property of an operation in which the user places the original on the original reading surface 47.

(Communication Device)

The image forming apparatus 1 includes at least one authentication device (hereinafter, referred to as a communication device) (information reading means). The communication device is connectable with a device-to-be-authenticated storing (holding) information (hereinafter, referred to as an information storing device) through wireless communication. The user brings (holds) the information storing device near to (over) the communication device, whereby the information storing device is connected with the communication device through the wireless communication. The communication device is a communication device capable of reading information from the information storing device through the wireless communication and/or writing information in the information storing device through the wireless communication. The communication device may be constituted so as to establish wireless communication with the information storing device in conformity with International standard ISO/IEC 18092 or International standard ISO/IEC 21481 by using a frequency band centering on 13.56 MHz at close range of more than ten cm.

For example, the communication device is an IC card reader for reading an IC card (integrated Circuit Card) of a non-contact communication type. The IC card of the non-contact communication type is an NFC-compatible IC card to be connected with the communication device through NFC (Near Field Communication) which is a near-range wireless communication means. The NFC-compatible IC card is, for example, Felica (registered trademark)-compatible IC card, Type A-compatible IC card and Type B-compatible IC card. The Felica (registered trademark)-compatible IC card is a high-speed processing IC card in conformity with Japanese Industrial Standard JIS X 6319-4. The type A-compatible IC card is a non-contact IC card in conformity with International standard ISO/IEC 14443A. The type B-compatible IC card is a non-contact IC card in conformity with International standard ISO/IEC 14443B. The NFC-compatible IC card is a thin plate having a dimension of about 85 mm in vertical length and about 55 mm in lateral length.

The communication device may also be constituted so as to establish the wireless communication with a storing device in conformity with Wireless communication standard IEEE 802.15.1 (Bluetooth (registered trademark) standard) by using 2.4 GHz band. The communication device may also be, for example, Bluetooth in which only Classic Bluetooth is implemented or Bluetooth Smart in which only BLE (Bluetooth Low Energy) is implemented. Further, the communication device may also be, for example, Bluetooth and the BLE are implemented.

The communication device may also be constituted so as to establish the wireless communication with an information storing device in conformity with Wireless communication standard IEEE 802.11 which is one of wireless LAN standards, by using Wi-Fi of 2.4 GHz band, 5 GHz band or 60 GHz band. Incidentally, the communication device of the present invention is not limited to the above-described communication devices, but may also be those including other information reading means.

The information storing device is, for example, the NFC-compatible IC card or an NFC-compatible mobile device (NFC-compatible electronic device) as the information terminal device. The NFC-compatible mobile device is, for example, an NFC-compatible cellular (mobile) phone, a smartphone, a tablet terminal, a tablet personal computer, an NFC-compatible camera, an NFC-compatible video camera and an NFC-compatible notebook(-size) personal computer. The communication device may also be constituted so as to automatically establish interconnection with the information storing device through the Bluetooth, the BLE, the Bluetooth Smart Ready or the Wi-Fi when for example, the information storing device is authenticated through the NFC.

(Communication Device Mounting Portion)

The image forming apparatus 1 of the embodiment 1 includes a plurality of communication devices. The communication device is capable of communicating, through the NFC, with the information storing device for storing information. To the image forming apparatus 1 of this embodiment, the plurality of communication devices are mounted. Specifically, the image forming apparatus 1 includes a first communication device 31, a second communication device 32 and a third communication device 33. In the following, with reference to FIGS. 3, 4 and 5, a mounting portion 23 to which the first communication device 31, the second communication device 32 and the third communication device 33 in the image forming apparatus 1 are mounted will be described.

Figure 3:
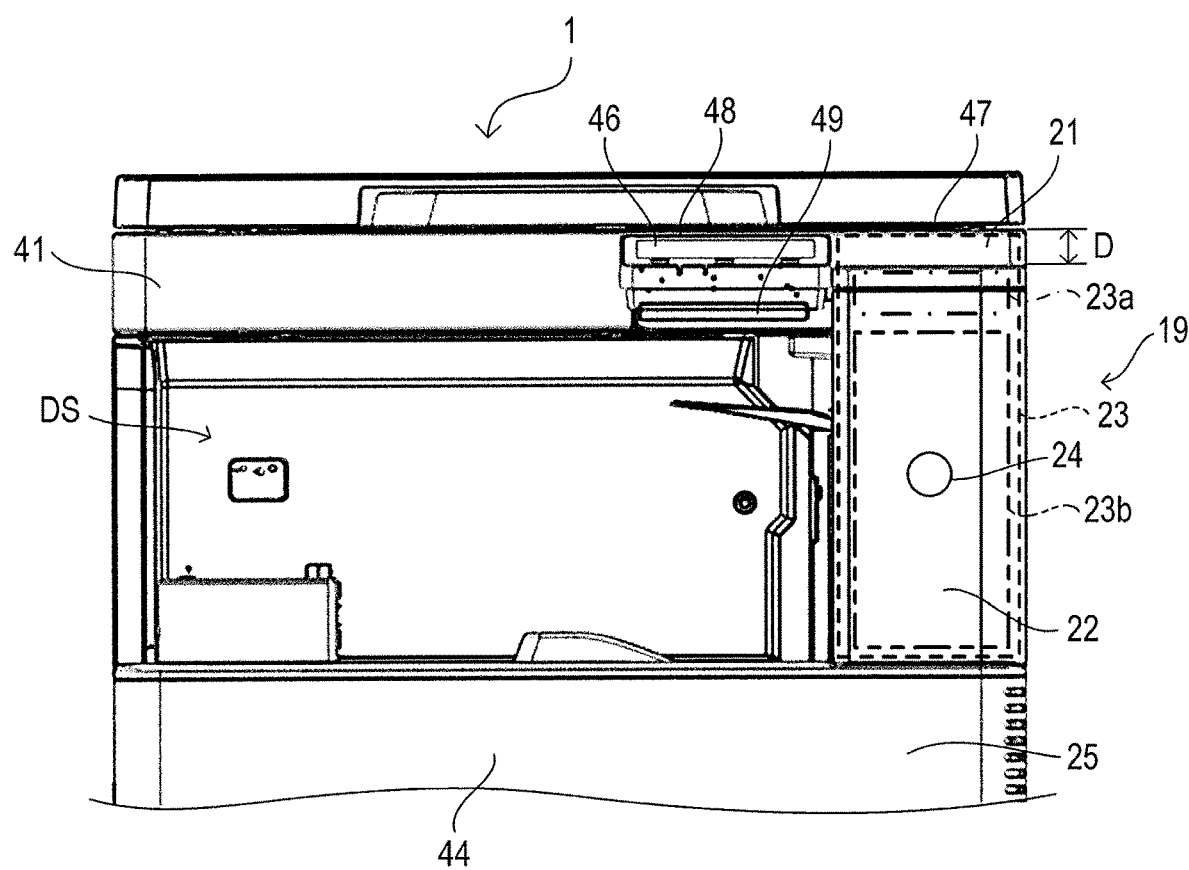
FIG. 3 is a partially front view of the image forming apparatus of the embodiment 1.
Figure 4:
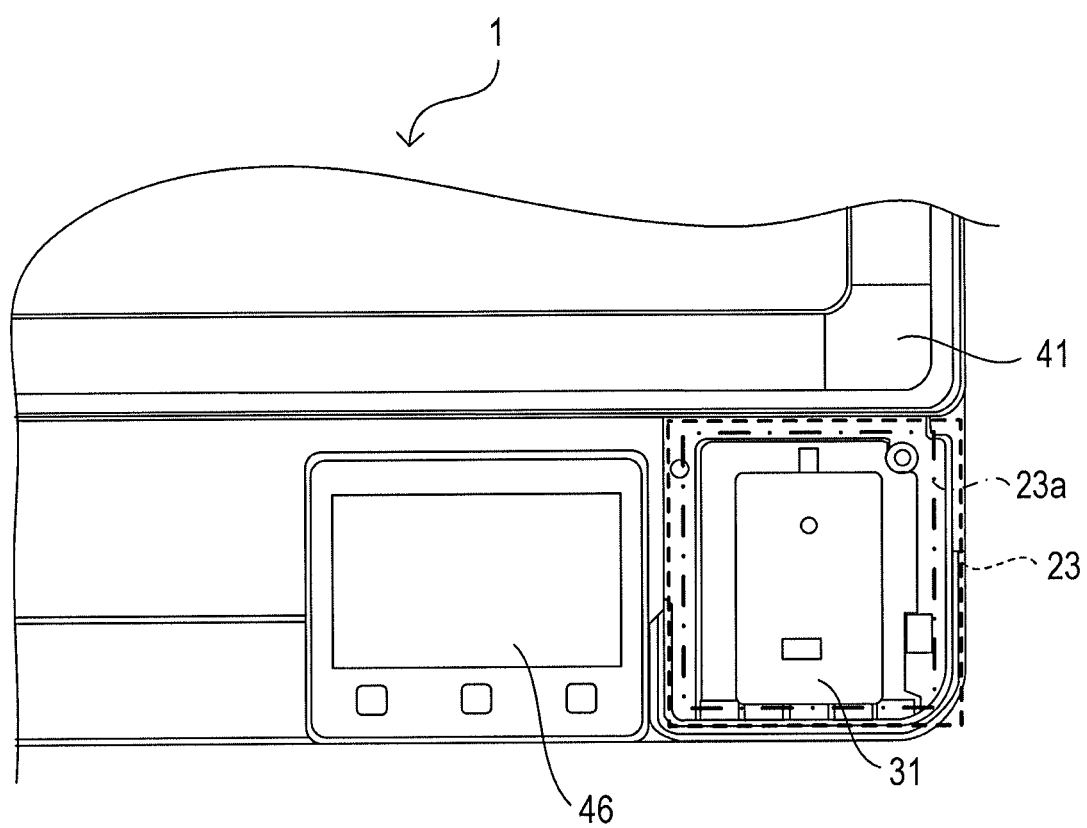
FIG. 4 is a partially top (plan) view of the image forming apparatus of the embodiment 1.
Figure 5:
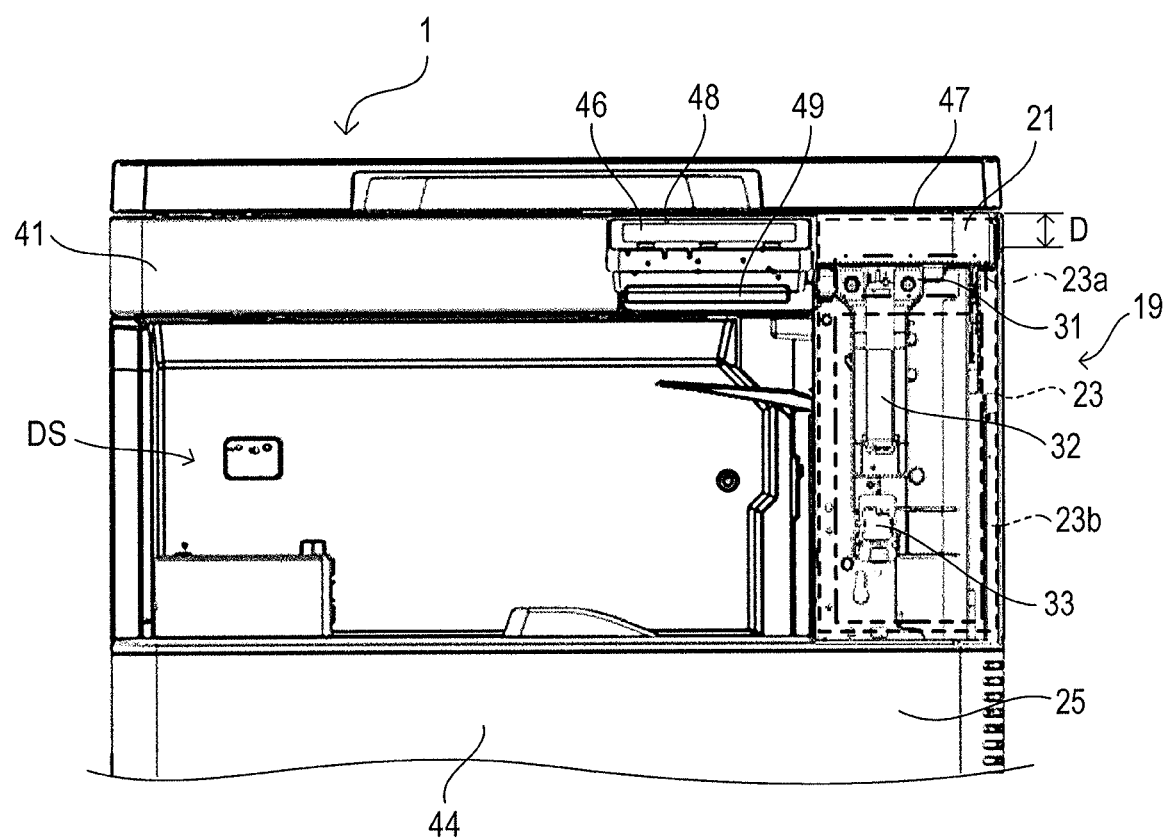
FIG. 5 is a partially sectional view of the image forming apparatus of the embodiment 1.

FIG. 3 is a partially front view of the image forming apparatus 1 of the embodiment 1. FIG. 4 is a partially top view of the image forming apparatus 1 of the embodiment 1. FIG. 5 is a partially sectional view of the image forming apparatus 1 of the embodiment 1. FIG. 3 is the view of the mounting portion 23 as seen from the front side. FIG. 4 is the view of the mounting portion 23 as seen from above, and is the view in which an upper portion (horizontal cover 21) of the mounting portion 23 is seen through so that the first communication device 31 disposed inside the mounting portion 23 is in sight. FIG. 5 is the view of the mounting portion 23 as seen from the front side, and is the in which a front surface (portion) (vertical cover 22) of the mounting portion 23 is seen through so that the first communication device 31, the second communication device 32 and the third communication device 33 which are disposed inside the mounting portion 23 are in sight.

As shown in FIG. 4, the operating portion 46 is provided, to the image forming apparatus 1, in front of the image reading portion 41 for reading the image of the original. The mounting portion 23 is provided at a front side portion of the image forming apparatus 1 and adjacent to the operating portion 46 on the right side of the operating portion 46. As shown in FIG. 3 and FIG. 5, the mounting portion 23 is provided at a portion corresponding to the vertical path portion 19 between the image reading portion 41 and the image forming portion 44. The mounting portion 23 is provided on the right side of the discharge space DS. The mounting portion 23 is provided at the same height as the original reading surface 47 or below the original reading surface 47 in a region surrounded by a broken line above the image forming portion 44. The first communication device 31, the second communication device 32 and the third communication device 33 are collected and disposed in the mounting portion 23. The mounting portion 23 includes a first mounting portion 23a surrounded by a chain line and a second mounting portion 23b surrounded by a chain double-dashed line. Further, the mounting portion 23 is covered with the horizontal cover 21 as a first outer casing member covering the image forming apparatus 1 with respect to the horizontal direction and with the vertical cover 22 as a second outer casing member covering the image forming apparatus 1 with respect to the vertical direction. The mounting portion 23 is provided inside the horizontal cover 21 and the vertical cover 22, and therefore, an outer appearance of the image forming apparatus 1 does not become complicated irrespective of whether or not the first communication device 31, the second communication device 32 and the third communication device 33 are mounted or not.

On an outer surface of the vertical cover 22, a target display portion 24 which is a target for causing the user to hold the mobile device (information terminal device 52 described later) over the target display portion 24 is formed. The target display portion 24 is provided on a front side-side surface of the image forming apparatus 1 on a side which is above the front door 25 and blow the image reading portion 41 with respect to the vertical direction. In this embodiment, at a substantially central portion of the front side (outer appearance surface) of the vertical cover 22 contained in a part of the outer casing covers of the image forming apparatus 1, the target display portion 24 in a circle (mark) which is a mark for bringing (holding) the mobile device near to (over) the second communication device 32 or the third communication device 33 is formed by silk(-screen) printing. The target display portion 24 is a target display when the mobile device is brought near to the second communication device 32 or the third communication device 33 in order that the second communication device 32 or the third communication device 33 receive information from the mobile device through the NFC. The NFC-compatible mobile device is connected with the second communication device 32 or the third communication device 33 through the NFC when the NFC-compatible mobile device is brought near to (disposed opposed to) the target display portion 24. The target display portion 24 is provided on the side surface of the image forming apparatus 1. The target display portion 24 is drawn by the circle (mark), but any notation such as illustration, symbols, characters, and the like within a range in which the user can recognize that the notation is a target portion of the second communication device 32 or the third communication device 33.

(First Mounting Portion)

FIG. 4 is the view showing the first communication device 31 mounted to the first mounting portion 23a after removing the horizontal cover 21. The first mounting portion 23a is disposed at the same height as the original reading surface 47 or below the original reading surface 47. The first mounting portion 23 is disposed at the same height as the upper surface 48 of the operating portion 46 or below the upper surface 48. By covering the first communication device 31 with the horizontal cover 21 covering the image forming apparatus 1, wiring (not shown) and connectors (not shown) which connect the image forming apparatus 1 with the first communication device 31 are accommodated in the first mounting portion 23a. Accordingly, the first communication device 31, the wiring (not shown) and the connectors (not shown) are not exposed to the outer appearance of the image forming apparatus 1.

As shown in FIG. 3, the horizontal cover 21 covering the image forming apparatus 1 in the horizontal direction is at the substantially same height as the original reading surface 47 of the image reading portion 41 and the upper surface 48 of the operating portion 46 or lower than the original reading surface 47 and the upper surface 48. Stepped portions D are provided between the operating portion 46 and the horizontal cover 21 and between the original reading surface 47 and the horizontal cover 21, and therefore, arrangement of the first communication device 31 can be made conspicuous to the user. Accordingly, an effect such that operativity when the user performs an authentication operation of the storing device relative to the first communication device 31 mounted to the first mounting portion 23a can be obtained.

(Second Mounting Portion)

FIG. 5 is the view showing the second communication device 32 and the third communication device 33 which are mounted to the second mounting portion 23b after removing the vertical cover 22. By covering the second communication device 32 and the third communication device 33 with the vertical cover 22 covering the image forming apparatus 1, wiring (not shown) and connectors (not shown) which connect the image forming apparatus 1 with the second communication device 32 and the third communication device 33 are accommodated in the second mounting portion 23b. Accordingly, the second communication device 32, the third communication device 33, the wiring (not shown) and the connectors (not shown) are not exposed to the outer appearance of the image forming apparatus 1.

As shown in FIG. 5, the second mounting portion 23b is at the substantially same height as a lower surface 49 or lower than the lower surface 49. The second mounting portion 23b is disposed at a height not more than the lower surface 49 of the operating portion 46, and therefore, irrespective of a size and a shape of the operating portion 46, the user can perform the authentication operation with no contact, with the operating portion 46, of the storing device or users hand holding the storing device. Accordingly, an effect such that operativity when the user performs the authentication operation of the storing device relative to the second communication device 32 or the third communication device 33 mounted to the second mounting portion 23b can be obtained.

Figure 6:
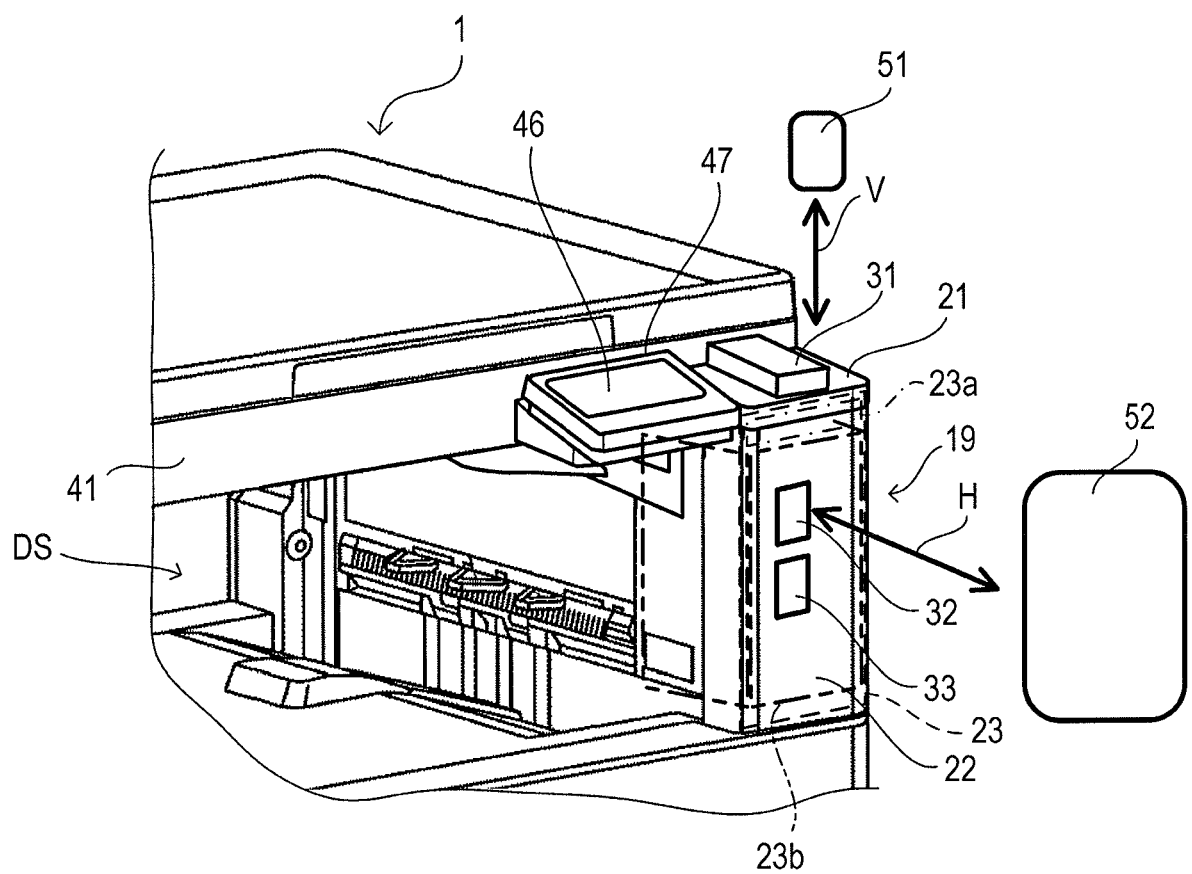
FIG. 6 is a partially perspective view of the image forming apparatus of a modified embodiment of the embodiment 1.

FIG. 6 is a partially perspective view of the image forming apparatus 1. FIG. 6 is the view showing the first communication device 31, the second communication device 32 and the third communication device 33 which are mounted to the mounting portion 23. The first communication device 31 is mounted to an outside of the horizontal cover 21 covering the image forming apparatus 1. Wiring (not shown) and connectors (not shown) connecting the image forming apparatus 1 with the first communication device 31 are accommodated in the first mounting portion 23a through the horizontal cover 21. Accordingly, an effect such that the wiring (not shown) and the connectors (not shown) for the first communication device 31 are not exposed to the outside of the image forming apparatus 1 can be obtained.

As shown in FIG. 6, the first communication device 31 is the IC card reader. The information storing device read by the IC card reader is an NFC-compatible IC card 51. The NFC-compatible IC card (IC tag) has a size (about 85 mm×about 55 mm) to the extent that the NFC-compatible IC card is accommodated in the palm of the (user's) hand so that the user can always carry the NFC-compatible IC card. The user can perform the authentication operation of the IC card 51 even in a relatively small operation space. The second communication device 32 and the third communication device 33 are connected with the information terminal device 52 through the NFC, the BLE, the Wi-Fi or the like. The information terminal device 52 is larger than the IC card as in the case of the smartphone, the tablet or the digital camera. As shown in FIG. 6, in front of the second communication device 32 or the third communication device 33, a relatively large operation space is provided. Accordingly, as regards the information terminal device 52, the user can comfortably perform the authentication operation of the information terminal device 52 even when the information terminal device 52 is the smartphone, the tablet or the digital camera which are relatively larger than the IC card.

(Authentication Operation)

As shown in FIG. 6, the user performs the authentication operation by bringing the IC card 51 near to the first communication device 31 in the vertical direction indicated by an arrow V. In the embodiment 1 shown in FIG. 1, the user may also bring the IC card 51 into contact with the horizontal cover 21. Further, as shown in FIG. 6, the user performs the authentication operation by bringing the information terminal device 52 near to the second communication device 32 or the third communication device 33 in the horizontal direction indicated by an arrow H. The user may also bring the information terminal device 52 into contact with the vertical cover 22. In the embodiment 1, the first communication device 31, the second communication device 32 and the third communication device 33 are adjacent to the right side of the operating portion 46 and are collected between the image reading portion 41 and the image forming portion 44. Therefore, the authentication operation with respect to the vertical direction indicated by the arrow V and the authentication operation with respect to the horizontal direction indicated by the arrow H can be performed with space saving.

According to this embodiment, the target display portion 24 for the information terminal device 52 was provided at a position remoter from the operating portion 46 than the target display portion 23 for the IC card 51 is. For that reason, a liability of contact, with the operating portion 46, of the information terminal device 52 brought near to the target display portion 24 is reduced. Further, according to this embodiment, the first communication device 31, the second communication device 32 and the third communication device 33 are collected and disposed at a portion corresponding to the vertical path portion 19 on the right side of the operating portion 46. Accordingly, even when the communication devices for authenticating the NFC-compatible IC card and the NFC-compatible mobile device are normal equipment or option equipment for the image forming apparatus 1, the user easily recognize the arrangement of the communication devices and the operativity of the authentication operation is good. Further, the communication devices and the wiring of the communication devices are not exposed to the outside from the main assembly of the image forming apparatus 1, and are accommodated in the image forming apparatus 1 so as not to have the influence on the outer appearance of the image forming apparatus 1. Further, according to this embodiment, the communication devices are disposed between the image reading portion 41 and the image forming portion 44, so that the authentication operation can be facilitated without making the outer appearance of the image forming apparatus 1 complicated.

Embodiment 2

Figure 7:
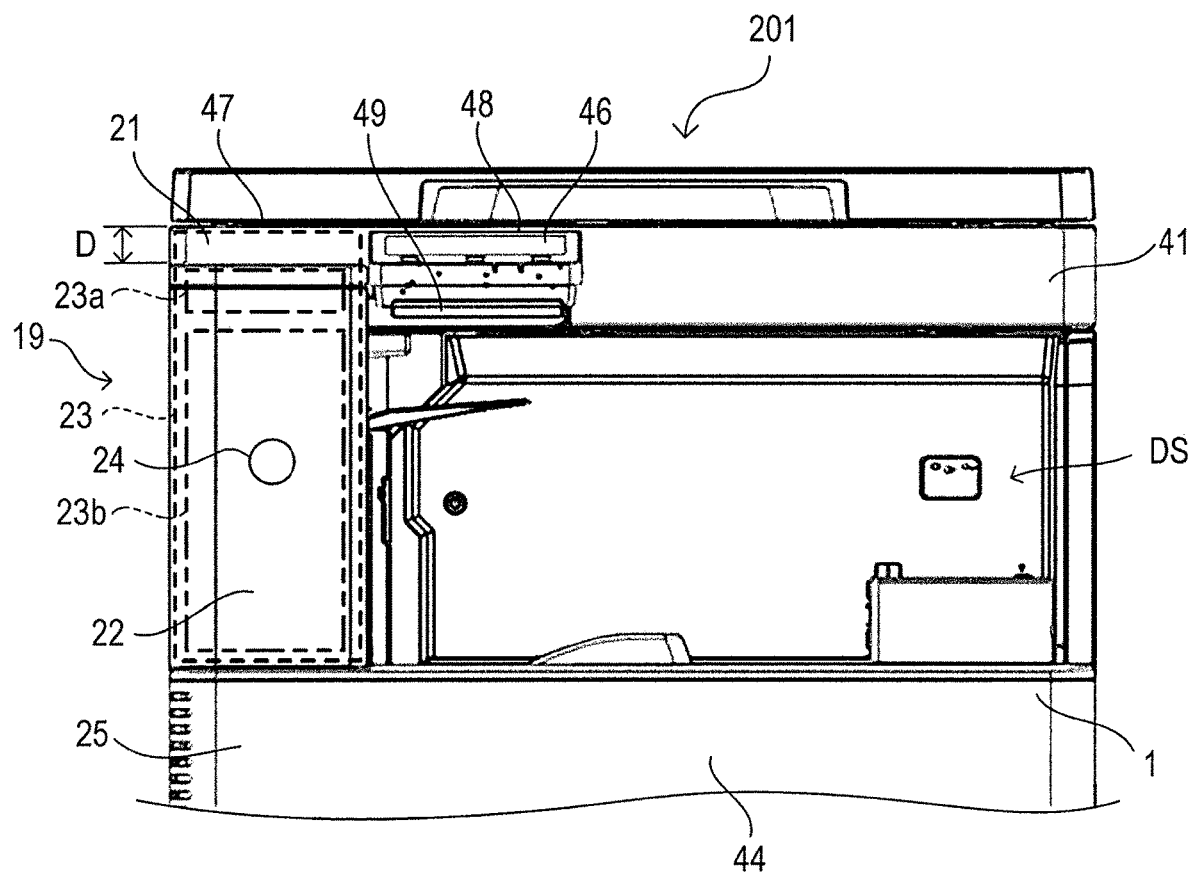
FIG. 7 is a partially front view of an image forming apparatus of an embodiment 2.

Next, with reference to FIG. 7, an embodiment 2 will be described. FIG. 7 is a partially front view of an image forming apparatus 201 of the embodiment 2. The image forming apparatus 201 of the embodiment 2 has a structure similar to the structure of the image forming apparatus 1 of the embodiment 1 except for a point that the vertical path portion 19 is disposed on a left side of the image forming apparatus 201. In the embodiment 2, structures similar to those in the embodiment 1 will be omitted from description by adding similar reference symbols thereto. An image forming process, the image reading portion 41, the operating portion 46 and the communication devices 31, 32 and 33 in the embodiment 2 have structures similar to those in the embodiment 1 and therefore will be omitted from description.

(Communication Device Mounting Portion)

The image forming apparatus 201 includes at least one communication device (information reading means). In the embodiment 2, the image forming apparatus 201 includes the first communication device 31, the second communication device 32 and the third communication device 33 similarly as in the first embodiment. The first communication device 31, the second communication device 32 and the third communication device 33 are mounted to a mounting portion 23. The mounting portion 23 is provided at a front side portion of the image forming apparatus 201 and adjacent to the operating portion 46 on the left side of the operating portion 46. As shown in FIG. 7, the mounting portion 23 is provided at a portion corresponding to the vertical path portion 19 between the image reading portion 41 and the image forming portion 44. The mounting portion 23 is provided on the left side of the discharge space DS. The mounting portion 23 is provided at the same height as the original reading surface 47 or below the original reading surface 47 in a region surrounded by a broken line above the image forming portion 44. The first communication device 31, the second communication device 32 and the third communication device 33 are collected and disposed in the mounting portion 23. The mounting portion 23 comprises a first mounting portion 23a surrounded by a chain line and a second mounting portion 23b surrounded by a chain double-dashed line. Further, the mounting portion 23 is covered with the horizontal cover 21 as a first outer casing member covering the image forming apparatus 201 with respect to the horizontal direction and with the vertical cover 22 as a second outer casing member covering the image forming apparatus 201 with respect to the vertical direction. The mounting portion 23 is provided inside the horizontal cover 21 and the vertical cover 22, and therefore, an outer appearance of the image forming apparatus 201 does not become complicated irrespective of whether or not the first communication device 31, the second communication device 32 and the third communication device are mounted or not.

According to this embodiment, the target display portion 24 for the information terminal device 52 was provided at a position remoter from the operating portion 46 than the target display portion 23 for the IC card 51 is. For that reason, a liability of contact, with the operating portion 46, of the information terminal device 52 brought near to the target display portion 24 is reduced. Further, according to this embodiment, the communication devices are disposed between the image reading portion 41 and the image forming portion 44, so that the authentication operation can be facilitated without making the outer appearance of the image forming apparatus 201 complicated.

Embodiment 3

Figure 8:
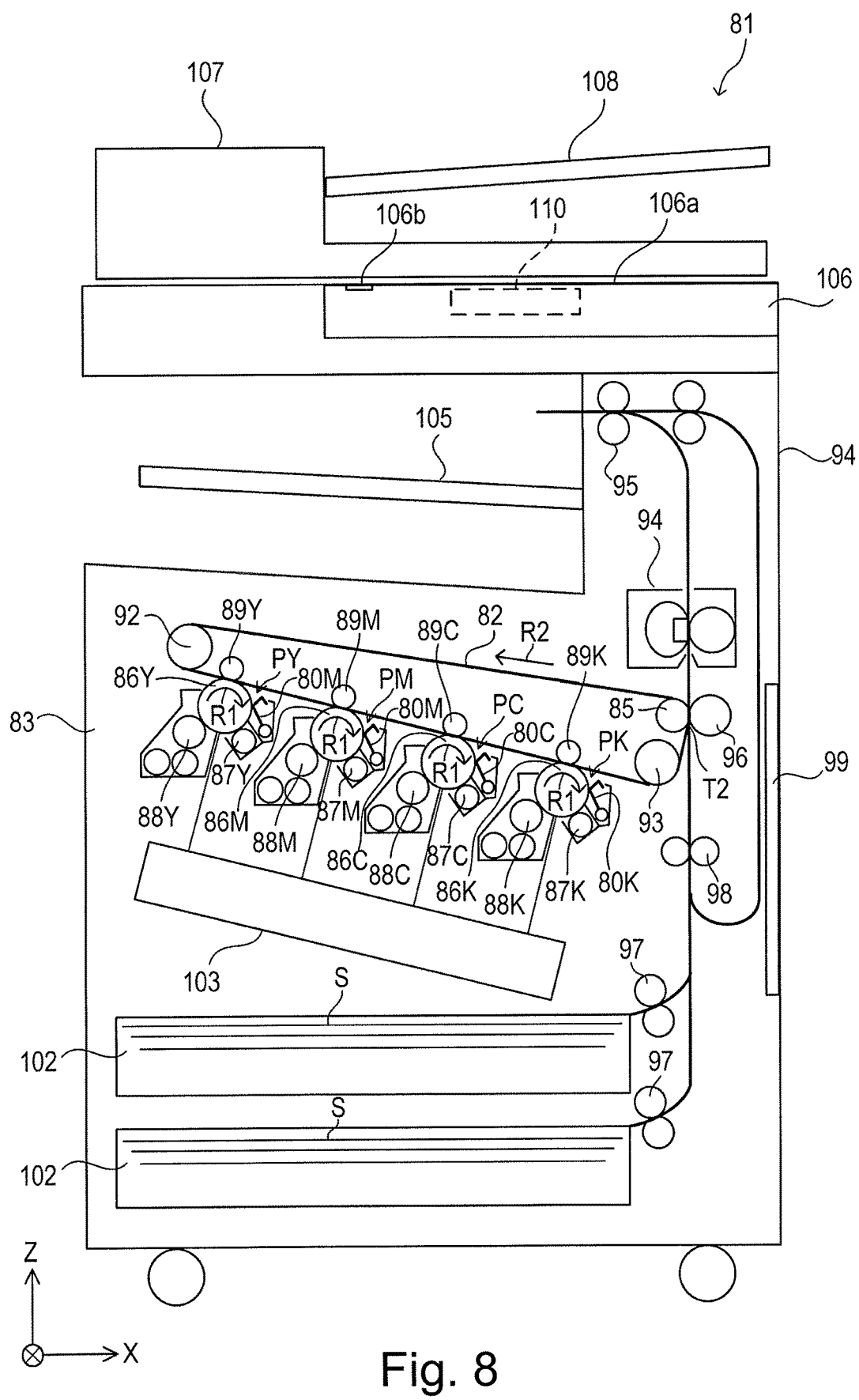
FIG. 8 is a sectional view of an image forming apparatus according to embodiments 3, 4 and 5.
Figure 9:
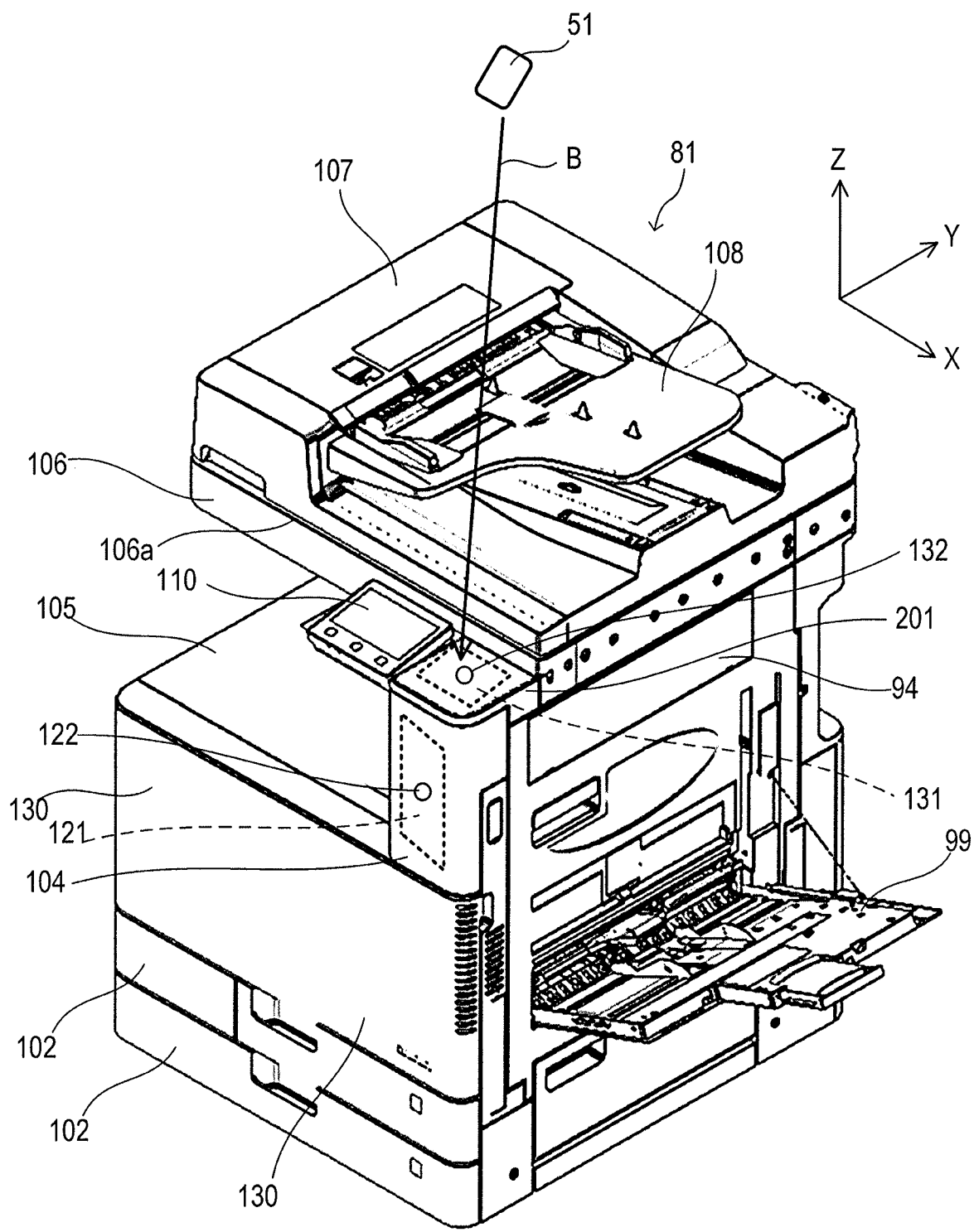
FIG. 9 is a sectional view of the image forming apparatus according to the embodiments 3, 4 and 5.

Next, with reference to FIG. 7 to FIG. 9, an embodiment 3 will be described. Incidentally, XYZ coordinate systems shown in FIG. 7 to FIG. 12 show directions with respect to image forming apparatuses 81, 111 and 121. An X axis shows a widthwise direction of the image forming apparatuses 81, 111 and 121, and an arrow direction is a rightward direction and a direction opposite to the arrow direction is a leftward direction. A Y axis shows a depth direction of the image forming apparatuses 81, 111 and 121, and an arrow direction is a rearward direction and a direction opposite to the arrow direction is a frontward direction. A Z axis shows a height direction of the image forming apparatuses 81, 111 and 121, and an arrow direction is an upward direction and a direction opposite to the arrow direction is a downward direction. A "◯" mark represents an arrow head (front end of the arrow) of the X axis, the Y axis or the Z axis, and a "x-in-◯" mark represents a rear end of the arrow of the X axis, the Y axis or the Z axis.

(Image Forming Apparatus)

FIG. 8 is a sectional view of the image forming apparatus 81 of the embodiment 3. FIG. 9 is a perspective view of the image forming apparatus 81 of the embodiment 3. As shown in FIG. 8, the image forming apparatus 81 is a full-color multi-function machine of a tandem type in which image forming portions PY, PM, PC and PK are provided along an intermediary transfer belt 82. The image forming apparatus 81 is an electrophotographic image forming apparatus for forming an image on a recording material (medium) S with use of an electrophotographic type, but is not limited thereto. The image forming apparatus 81 may also be an ink jet printer. The recording material S is a transfer material on which the image is formed by the image forming apparatus 81, and for example, paper, an OHP sheet, a cloth and the like. Hereinafter, the recording material S is referred to as a sheet S.

The image forming portion PY forms a yellow image with use of yellow toner. The image forming portion PM forms a magenta image with use of magenta toner. The image forming portion PC forms a cyan image with use of cyan toner. The image forming portion PK forms a black image with use of black toner. Suffixes Y, M, C and K of reference symbols represent yellow, magenta, cyan and black, respectively. In the following description, in the case where there is no particular need, the suffixes Y, M, C and K are omitted in some instances. The four image forming portions P have the same structure except for colors of developers (toners).

The image forming portion P includes a photosensitive drum (image bearing member) 86 as a photosensitive member. The photosensitive drum 86 is rotatable in a direction indicated by an arrow R1. Around the photosensitive drum 86, a charging device 87, an optical scanning apparatus 83, a developing device 88, a primary transfer device 89 and a drum cleaning device 80 are provided. Above the photosensitive drum 86, an endless intermediary transfer belt (intermediary transfer member) 82 is provided.

The intermediary transfer belt 82 is stretched by a driving roller 92 and two follower rollers 93 and 95. The intermediary transfer belt 82 rotates in a direction indicated by an arrow R2 of FIG. 1 during image formation. The primary transfer device 89 is disposed opposed to the photosensitive drum 86 through the intermediary transfer belt 82. The primary transfer device 89 transfers the toner image, on the photosensitive drum 86, onto the intermediary transfer belt 82. A secondary transfer roller (secondary transfer member) 96 is provided opposed to the follower roller 85 through the intermediary transfer belt 82 and forms a secondary transfer portion T2.

At a lower portion of the image forming apparatus 81, the feeding cassette 102 in which the sheets S are accommodated is disposed. The feeding cassette 102 is mounted in the main assembly (hereinafter, referred to as an apparatus main assembly) 83 of the image forming apparatus 81 so as to be pullable toward the front side. Further, at a side portion of the apparatus main assembly 83, a manual feeding tray 99 is provided so as to be openable and closable. The sheet S is fed from the manual feeding tray 99 or the feeding cassette 102 by a feeding roller 97. The sheet S is conveyed toward the secondary transfer roller 96 by a registration roller 98. A fixing device 84 is disposed on a side downstream of the secondary transfer roller 86 with respect to a feeding direction of the sheet S. The fixing device 84 is provided in a vertical path portion 94. The sheet S is conveyed above in the vertical direction in the vertical path portion 94 from the secondary transfer roller 96 toward the discharging roller 95 through the fixing device 84. With respect to the feeding direction of the sheet S, on a side downstream of the fixing device 84, a discharge tray 105 for stacking the sheets S on which images are formed is provided. The sheets S passed through the vertical path portion 94 are discharged onto the discharge tray 105.

In the vertical path portion 94 below an operating portion 110, a sheet S feeding portion including the discharging roller 95, various sensors, the fixing device 84 and an air-blowing fan are accommodated. The discharge tray 105 which is an example of a stacking portion is disposed between the apparatus main assembly 83 and an image reading portion 106, and the sheets S on which the images are formed by the apparatus main assembly 103 are stacked. The user is capable of taking the sheets S on the discharge tray 105 out of the image forming apparatus from the front side.

(Image Forming Process)

Next, an image forming process of the image forming apparatus 81 will be described. Image forming processes in the four image forming portions P are the same, and therefore, the image forming process in the yellow image forming portion PY will be described. Description of the image forming processes in the magenta image forming portion PM, the cyan image forming portion PC and the black image forming portion PK will be omitted.

The charging device 2Y electrically charges a surface of the photosensitive drum 86Y uniformly. The optical scanning apparatus 103 emits a light beam, modulated in accordance with image information of a yellow component, toward the uniformly charged surface of the photosensitive drum 86Y, and forms an electrostatic latent image on the photosensitive drum 86Y. The developing device 88Y develops the electrostatic latent image into a yellow toner image with yellow toner (developer). The primary transfer device 89Y primary-transfers the yellow toner image, on the photosensitive drum 86Y, onto the intermediary transfer belt 82. The toner remaining on the photosensitive drum 86Y after the primary transfer is removed by the drum cleaning device 100Y, and the photosensitive drum 86 prepares for subsequent image formation.

In a similar manner, the magenta toner image formed by the magenta image forming portion PM is transferred superposedly onto the yellow toner image on the intermediary transfer belt 12 with accuracy. Then, the cyan toner image and the black toner image are successively transferred superposedly onto the magenta toner image on the intermediary transfer belt 82. As a result, the four color toner images are superposed on each other on the intermediary transfer belt 82.

The sheet S fed from the feeding cassette 102 or the manual feeding tray 99 is conveyed toward the secondary transfer roller 96 by being timed to the toner images on the intermediary transfer belt 82 by the registration roller 98. The four color toner images superposed on the intermediary transfer belt 82 are collectively secondary-transferred onto the sheet S by the secondary transfer roller 96. The sheet S on which the toner images are transferred is conveyed to the fixing device 84. The fixing device 84 fixes the toner images on the sheet S by heating and pressing the sheet S. The sheet S on which the image is formed is discharged onto the discharge tray 105 by the discharging roller 95.

(Image Reading Portion)

Above the main assembly 83, the image reading portion (flat head scanner) 106 is disposed through the vertical path portion 94. The image reading portion 106 is operable in a manual reading mode (fixed reading mode) and an automatic reading mode (skim through mode). In the manual reading mode, the user raises an automatic document feeder (ADF) 107 and places the original on the reading surface 106a. The image reading portion 106 optically reads an image on a lower surface of an original placed on a reading surface (glass plate) 106a and converts the image into the image data. In the automatic reading mode, the automatic document feeder 107 separates originals one by one from a batch of originals stacked on an original tray 108 and feeds the original to the reading surface 106a. The image reading portion 106 optically reads an image of the original fed on the reading surface 106a and converts the image into image data.

(Operating Portion)

The image forming apparatus 81 is provided with the operating portion 46 for permitting the user to input information or an instruction and to operate the image forming apparatus 81. The operating portion 46 is similar to that described in the embodiment 1, and therefore will be omitted from description.

(Communication Device)

Figure 10:
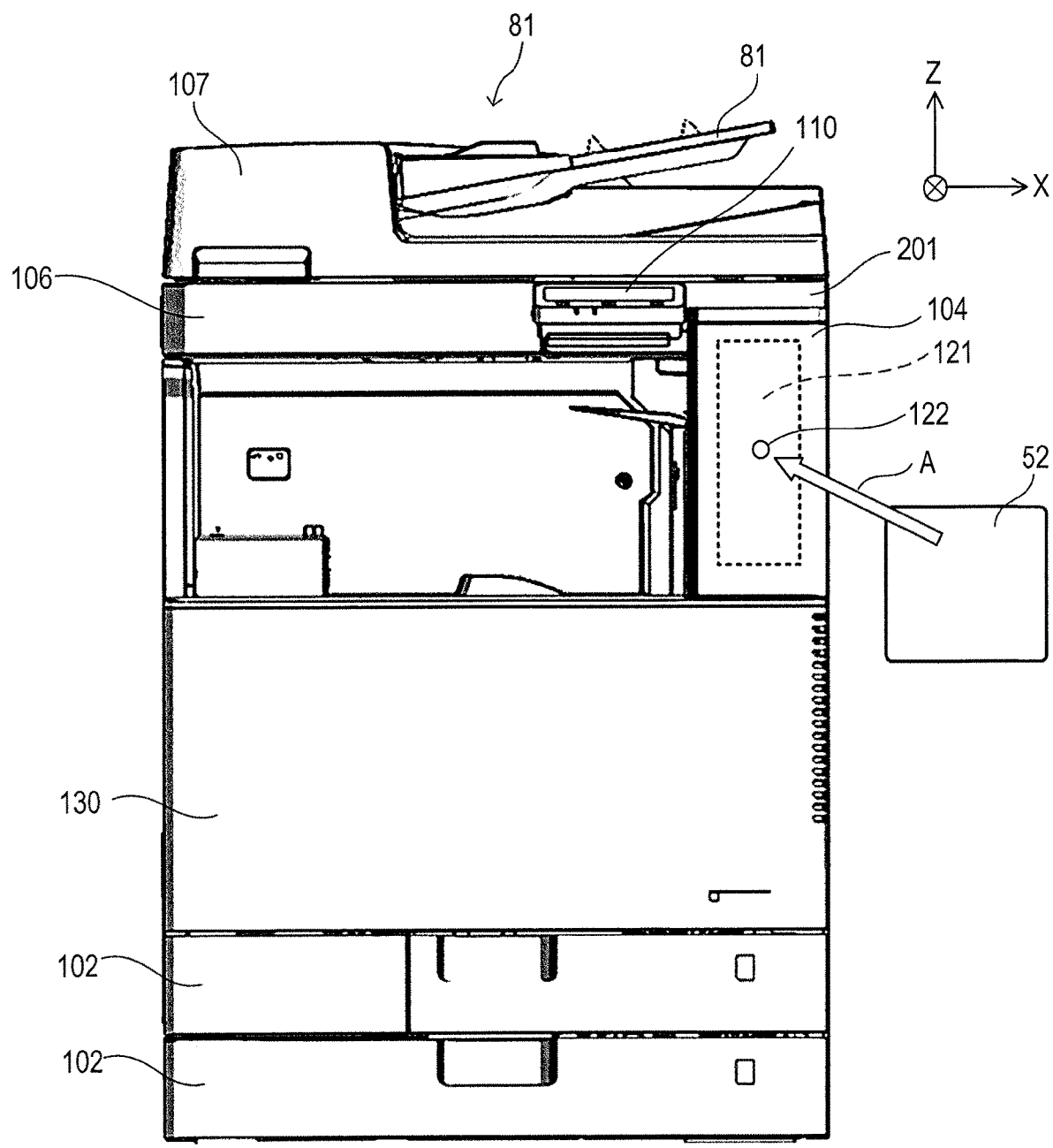
FIG. 10 is a front view of the image forming apparatus according to the embodiments 3, 4 and 5.

Next, using FIG. 9 and FIG. 10, a communication device 121 and a fifth communication device 131 will be described. The communication device 121 in this embodiment corresponds to the first communication device 31 in the embodiment 1. Further, the communication device 131 in this embodiment corresponds to the second communication device 32 or the third communication device in the embodiment 1. FIG. 10 is a front view of the image forming apparatus 81. The communication device 121 and the communication device 131 include near-range (field) wireless communication means, respectively. The information terminal device 52 is a storing device for storing information. The communication device 121 connectable with the information terminal device 52 through the near-field wireless communication (hereinafter, referred to as NFC) is disposed inside a vertical path portion cover 104 similarly as in the embodiment 1. A front surface of the vertical path portion cover 104 is a substantially flat surface and is substantially flush with a forefront surface of a front cover 130 of the image forming apparatus 81 and a forefront surface of the image reading portion 106 or is positioned in front of these surfaces. Further, substantially at a central portion of the front surface (outer appearance surface) of the vertical path portion cover 104, a circular target display portion 122 which is a mark for causing the user to bring (hold) the information terminal device 52 near to (over) the communication device 121 is formed by silk(-screen) printing. The target display portion 122 is a target display targeted by the user when the user brings the information terminal device 52 near to the communication device 121 in order to receive information from the communication device 121 through the NFC. The information terminal device 52 is connected with the communication device 121 through the NFC when is brought near to the target display portion 122. The target display portion 122 is provided on a side wall surface (side surface) of the image forming apparatus 81.

The information terminal device 52 an NFC-compatible mobile device. The NFC-compatible mobile device is, for example, an NFC-compatible cellular (mobile) phone, a smartphone, a tablet terminal, a tablet personal computer, an NFC-compatible camera, an NFC-compatible video camera and an NFC-compatible notebook(-size) personal computer. A communication area of the NFC connecting the information terminal device 52 with the communication device 121 is from several centimeters to about 1 meter in communication distance. The NFC connecting the information terminal device 52 with the communication device 121 is, for example, the Wi-Fi (registered trademark) or the Bluetooth (registered trademark). The Wi-Fi (registered trademark) is interconnection between devices in conformity with the Wireless communication standard IEEE 802.11 in which wireless communication is performed using 2.4 GHz band, 5 GHz band or 60 GHz band. The Bluetooth (registered trademark) is interconnection between devices in conformity with the Wireless communication standard IEEE 802.15.1 in which wireless communication is performed using 2.4 GHz band.

For example, an application software (hereinafter, referred to as application) is installed in the information terminal device 52, and the application is lunched. By operating the information terminal device 52 toward the target display portion 122 in an arrow A direction, the information terminal device 52 is connected with the communication device 121 through the NFC. A direction in which the information terminal device 52 is operated toward the target display portion 122 is not limited to the arrow A direction, but may also be a direction from left to right, a direction from right to left, and a direction from below to above. The direction in which the information terminal device 52 is operated toward the target display portion 122 is different from a direction in which the user operates the operating portion 110 from above to below. An access direction of the information terminal device 52 to the target display portion 122 is different from an access direction of the user to the operating portion 110, so that misoperation of the image forming apparatus 81 due to access of the information terminal device 52 can be prevented.

As shown in FIG. 10, the target display portion 122 of the communication device 121 is provided at the forefront surface of the image forming apparatus 81. When the user operates the information terminal device 52 toward the first target display portion 122 in the arrow A direction, there is no obstacle to the operation at the front surface (front side) of the image forming apparatus 81, so that the user is capable of authenticating the information terminal device 52 by the communication device 121 with accuracy. In the case where the information terminal device 52 is, for example, a tablet terminal having a screen size of about 254 mm (10 inches) in diagonal line, a projection area of the information terminal device 52 is relatively large. Even in the case where such a tablet terminal is operated toward the first target display portion 122 in the arrow A direction, a relatively broad space is ensured in front of the vertical path portion cover 104 on which the first target display portion 122 is formed, so that operativity is improved. According to this embodiment, even in the case where the information terminal device 52 having the relatively large area is operated, the operativity is satisfactory, so that the communication device 121 is capable of communicating with the information terminal device 52 with reliability.

As shown in FIG. 9, the fifth communication device 131 connectable with the information terminal device 52 through the NFC is disposed above the vertical path portion cover 104. The information terminal device 52 is the storing device for storing the information. The firth communication device 131 acquires the information from the information terminal device 52 through the NFC. The fifth communication device 131 is disposed beside the operating portion 110. Specifically, the fifth communication device 131 is disposed on the right side of the operating portion 110 and inside an upper right cover 201 provided at an upper portion of the vertical path portion cover 104. At a substantially central portion of an upper surface of the upper right cover 201, a circular target display portion 132 which is a mark for causing the user to bring (hold) the information terminal device 52 near to (over) the fifth communication device 31 is formed by silk(-screen) printing. The second target display portion 132 is provided at a position different from the first target display portion 122. The second target display portion 132 is disposed beside the touch panel of the operating portion 110. The second target display portion 132 in this embodiment is disposed adjacent to the operating portion 110 with respect to a left-right direction relative to a front-rear direction of the image forming apparatus 81. As shown in FIG. 9, the second target display portion 132 is adjacent to the manual feeding tray 99 side relative to the operating portion 110. Further, the user operates the information terminal device 52 from above the image forming apparatus 81 toward the second target display portion 132 in an arrow B direction. When the information terminal device 52 is brought near to (opposed to) the second target display portion 132, the information terminal device 52 performs the wireless communication with the fifth communication device 131 through the NFC.

The NFC-communication device IC card is, for example, a thin plate having a dimension of about 85 mm in vertical length and about 55 mm in lateral length. The NFC-compatible IC card is smaller in dimension than the NFC-compatible mobile device. Accordingly, even when the user operates the information terminal device 52 toward the fifth communication device 132 in the direction indicated by the arrow B, the information terminal device 52 itself and fingers (of the user) holding the information terminal device 52 are not close to the touch panel of the operating portion 110, and therefore, the fingers do not readily contact the touch panel. Even when the fifth communication device 131 is provided beside the touch panel of the operating portion 110, an occurrence of misoperation of the image forming apparatus 81 due to the operation of the information terminal device 52 is reduced. Further, the IC card is held in a holder provided with a strap for being put on user's neck or held in a holder provided with a reel in many instances. When the second target display portion 132 is provided on the side surface of the image forming apparatus 81, users using holders with a short length of the strap or with a short length of the reel have to perform a stooping operation for causing the IC card to face the second target display portion 132, so that it is not preferable from the viewpoint of usability. For that reason, in this embodiment, the second target display portion 132 is provided on a side above the first target display portion 122 in the vertical direction.

The communication device 121 is disposed in the neighborhood of the communication device 131. Therefore, wiring of the communication device 121 and wiring of the fifth communication device 131 can be connected with a controller substrate provided at a rear portion of the image forming apparatus 81 through an inside of the same space.

A position where the communication device 121 is disposed is different from a position where the fifth communication device 131 is disposed. The position where the communication device 121 is disposed is distant from the operating portion 110 more than the position where the fifth communication device 131 is disposed is. According to this embodiment, it is possible to suppress that the misoperation of the image forming apparatus 81 occurs when the user holds the information terminal device 52 over the communication device 121.

Embodiment 4

Figure 11:
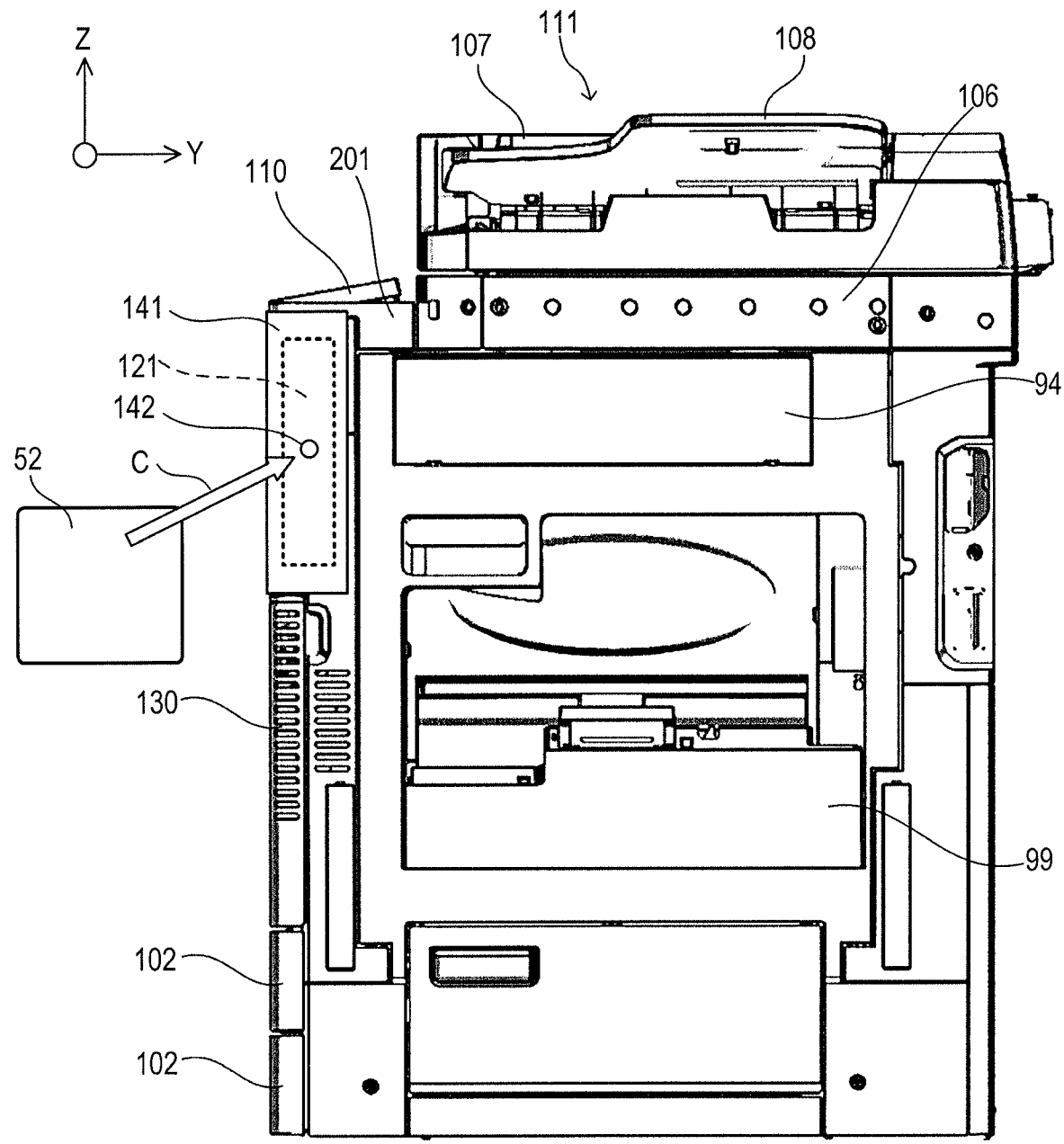
FIG. 11 is a right side view of the image forming apparatus according to the embodiments 3, 4 and 5.

Next, with reference to FIG. 11, an embodiment 4 will be described. FIG. 11 is a right side view of the image forming apparatus 111 of the embodiment 3. In the embodiment 3, structures similar to those in the embodiment 3 will be omitted from description by adding similar reference symbols thereto. The image forming apparatus 111 of the embodiment 4 has a structure substantially similar to the image forming apparatus 81 in the embodiment 3 and therefore will be omitted from description. The communication device 121 in the embodiment 4 is the same as the communication device 121 in the embodiment 3 and therefore will be omitted from the description. However, a locating position of the communication device 121 in the embodiment 4 is different from a locating position of the communication device 121 in the embodiment 3. In the following, the locating position of the communication device 121 in the embodiment 4 will be described.

(Communication Device)

The target display portion 122 in the embodiment 3 is formed on the vertical path portion cover 104 which is the forefront surface (side) of the image forming apparatus 81. On the other hand, a target display portion 142 in the embodiment 4 is formed on a right side wall surface of the image forming apparatus 111. Specifically, the communication device 121 is disposed inside a right front vertical cover 141. A right side surface of the right front vertical cover 141 is a substantially flat surface and is substantially flush with other right side covers of the image forming apparatus 111 or is positioned on an outermost side of the right side (surface) of the image forming apparatus 111. The communication device 131 is disposed on the right side of the operating portion 110 and inside the upper right cover 201 similarly as in the embodiment 3.

The manual feeding tray 99 is mounted on the right side (surface) of the image forming apparatus 111 so as to be openable and closable. The image forming apparatus 111 is of a vertical path type in which the sheet S is fed from below to above, and therefore, a relatively broad flat surface portion can be provided on the right side surface of the image forming apparatus 111. Accordingly, a degree of freedom that a space for accommodating the communication device 121 is provided inside the right side surface of the image forming apparatus 111 and a degree of freedom that the target display portion 142 is disposed on the right side surface of the image forming apparatus 111 are provided. Further, by providing the target display portion 142 on the right side surface of the image forming apparatus 111, the user can bring the information terminal device 52 near to the target display portion 142 in a state in which the user stands on the front side of the image forming apparatus 111. The operating portion 110 is disposed on the front side of the image forming apparatus 111, so that the target display portion 142 is disposed on the right side surface of the image forming apparatus 111 and on a side (front side) closer to the front surface than the operating portion 110 is. The first target display portion 142 is disposed close to the operating portion 110, so that operativity to the image forming apparatus 111 by the user is improved.

For example, an application software installed in the information terminal device 52 is lunched, and by operating the information terminal device 52 toward the target display portion 142 in an arrow C direction, the information terminal device 52 is connected with the communication device 121 through the NFC. A direction in which the information terminal device 52 is operated toward the target display portion 142 is not limited to the arrow C direction, but may also be a direction from right front to right rear, a direction from right rear to right below, a direction from right below to right above, and a direction from right above to right below. The direction in which the information terminal device 52 is operated toward the target display portion 142 is different from a direction in which the user operates the operating portion 110 from above to below. An access direction of the information terminal device 52 to the target display portion 142 is different from an access direction of the user to the operating portion 110, so that the information terminal device 52 itself does not contact the operating portion 110. Further, fingers (of the user) holding the information terminal device 52 do not contact the operating portion 110 or are prevented from being near to the operating portion. Therefore, misoperation of the image forming apparatus 111 due to access of the information terminal device 52 to the target display portion 142 can be suppressed.

A position where the communication device 121 is disposed is different from a position where the communication device 131 is disposed. The position where the communication device 121 is disposed is distant from the operating portion 110 more than the position where the communication device 131 is disposed is. According to this embodiment, it is possible to prevent that the misoperation of the image forming apparatus 111 occurs when the user holds the information terminal device 52 over the communication device 121.

Embodiment 5

Figure 12:
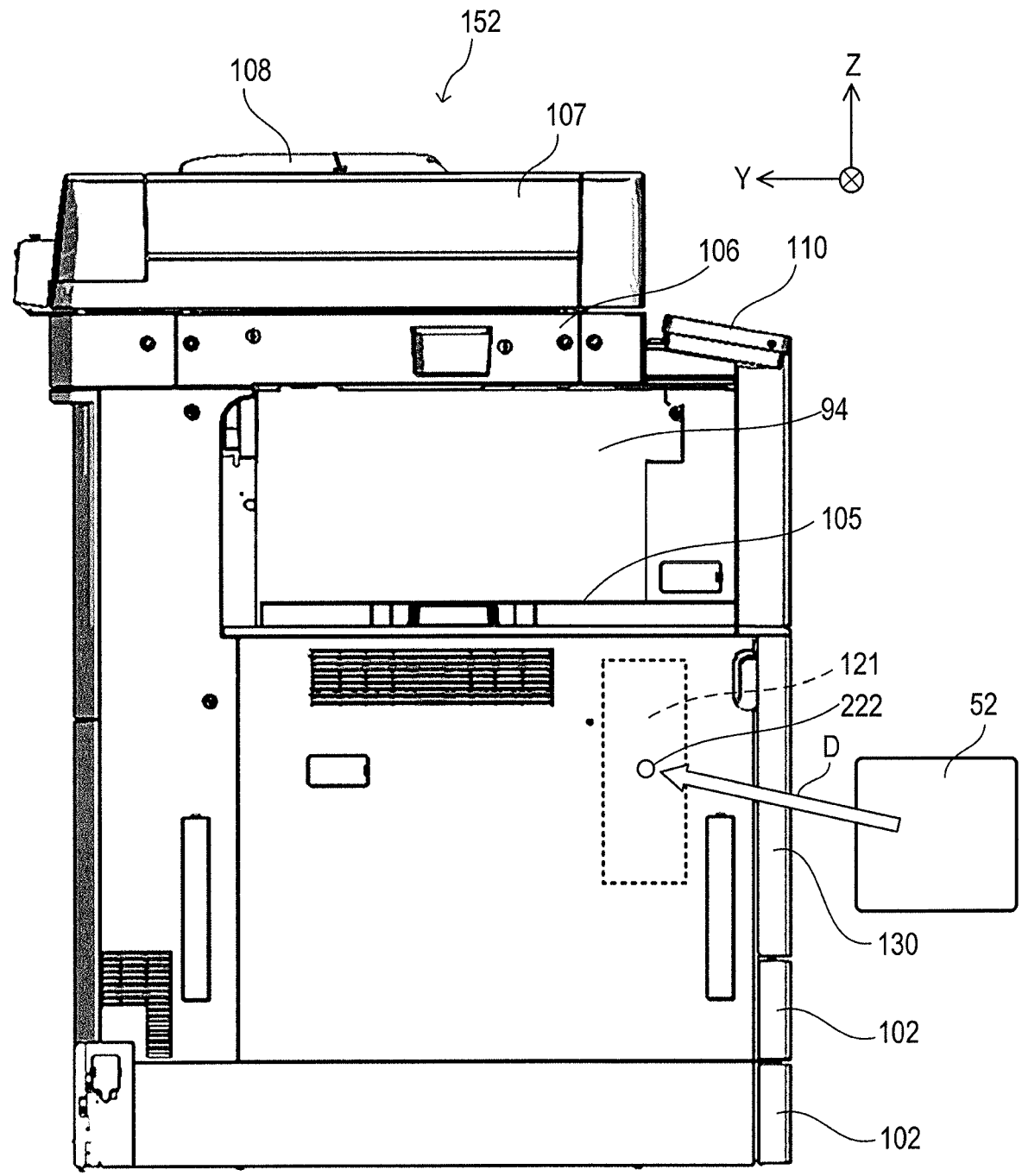
FIG. 12 is a left side view of the image forming apparatus according to the embodiments 3, 4 and 5.

Next, with reference to FIG. 12, an embodiment 5 will be described. FIG. 12 is a left side surface of the image forming apparatus 151 of the embodiment 5. In the embodiment 5, structures similar to those in the embodiment 3 will be omitted from description by adding similar reference symbols thereto. The image forming apparatus 151 of the embodiment 5 has a structure substantially similar to the image forming apparatus 81 in the embodiment 3 and therefore will be omitted from description. The communication device 121 in the embodiment 5 is the same as the communication device 121 in the embodiment 3 and therefore will be omitted from the description. However, a locating position of the communication device 121 in the embodiment 5 is different from a locating position of the communication device 121 in the embodiment 3. In the following, the position where the communication device 121 in the embodiment 5 is disposed will be described.

(Communication Device)

The target display portion 122 in the embodiment 3 is formed on the vertical path portion cover 104 which is the forefront surface (side) of the image forming apparatus 81. The target display portion 142 in the embodiment 4 is formed on the right front vertical cover 141 which is the outermost surface of the right side surface of the image forming apparatus 111. On the other hand, a target display portion 222 in the embodiment 5 is formed on a left side wall surface of the image forming apparatus 151. Specifically, the communication device 121 is disposed inside a left device 102. The left cover 102 is a substantially flat surface and is substantially flush with other left side covers of the image forming apparatus 151 or is positioned on an outermost side of the left side wall surface of the image forming apparatus 151. The communication device 131 (not shown in FIG. 5) is disposed on the right side of the operating portion 110 and inside the upper right cover 201 similarly as in the embodiment 3.

The left cover 102 is fixed on the left side of the image forming apparatus 151. The left device 102 occupies a large area on the left side (surface) of the image forming apparatus 151. Accordingly, a degree of freedom that a space for accommodating the communication device 121 is provided inside the left side surface of the image forming apparatus 151 and a degree of freedom that the target display portion 222 is disposed on the left side surface of the image forming apparatus 151 are provided. Further, by providing the first target display portion 222 on the left side surface of the image forming apparatus 151, the operativity of the information terminal device 52 to the first target display portion 222 is also good. The operating portion 110 is disposed on the front side of the image forming apparatus 151, so that the first target display portion 222 is disposed on the left side surface of the image forming apparatus 151 and on a side (front side) closer to the front surface than the operating portion 110 is. The user can bring the information terminal device 52 near to the target display portion 142 in a state in which the user stands on the front side of the image forming apparatus 111.

For example, an application software installed in the information terminal device 52 is lunched, and by operating the information terminal device 52 toward the first target display portion 222 in an arrow D direction, the information terminal device 52 is connected with a first communication device 221 through the NFC. A direction in which the information terminal device 52 is operated toward the target display portion 222 is not limited to the arrow D direction, but may also be a direction from left front to left rear, a direction from left rear to left front, a direction from left below to left above, and a direction from left above to left below. The direction in which the information terminal device 52 is operated toward the target display portion 222 is different from a direction in which the user operates the operating portion 110 from above to below. An access direction of the information terminal device 52 to the target display portion 222 is different from an access direction of the user to the operating portion 110, so that the information terminal device 52 itself does not contact the operating portion 110. Further, fingers (of the user) holding the information terminal device 52 do not contact the operating portion 110 or are prevented from being near to the operating portion. Therefore, misoperation of the image forming apparatus 151 due to access of the information terminal device 52 to the target display portion 222 can be prevented.

A position where the communication device 121 is disposed is different from a position where the communication device 131 is disposed. The position where the communication device 121 is disposed is distant from the operating portion 11 more than the position where the communication device 131 is disposed is. According to this embodiment, it is possible to prevent that the misoperation of the image forming apparatus 151 occurs when the user holds the information terminal device 52 over the communication device 131.

The operating portions 110 in the embodiment 3 to the embodiment 5 are, as shown in FIG. 8 to FIG. 12, small relative to sizes of the image forming apparatuses 81, 141 and 151. On the other hand, from the viewpoint of improvement in operativity, a display input portion of the operating portion 110 is upsized in some instances. With this, the operating portion 110 itself becomes large, but the target display portions 122 and 222 are positioned on the outermost surfaces on the front side, the right side and the left side of the apparatus main assembly 83 excluding the operating portion 110. Accordingly, the operativity of the information terminal device 52 to the first target display portions 121, 142 and 222 is improved while maintaining an outer appearance quality of the image forming apparatuses 81, 141 and 111, so that communication with the information terminal device 52 by the communication device 121 can be performed with reliability.

Further, in the embodiment 3 to the embodiment 5, the target display portions 121, 142 and 222 are drawn by the circles, but any notation such as illustration, symbols, characters, and the like within a range in which the user can recognize that the notation is a target portion for the information terminal device 52.

On the discharge tray 105, as an option, an in-body finisher (not shown) may also be provided. Or, on the discharge tray 105a, a buffer path unit (not shown) as an option is provided, and the buffer path unit (not shown) may also deliver the sheet S to an external finisher attached to an outside of the image forming apparatuses 81, 141 and 151. In that case, the first target display portion is disposed on at least one side wall surface of all direction side surfaces of the image forming apparatuses 81, 141 and 151 including options. When the information terminal device 52 is operated toward the target display portion 122 of the communication device 121, the information terminal device 52 can be caused to communicate with the first communication device 121 without preventing operativity thereof by the options.

According to the above-described embodiment, the target display portion of the communication device capable of the near-range (field) wireless communication is disposed on at least one side surface excluding the rear surface of the all direction side surfaces of the image forming apparatus. When a device-to-be-authenticated is operated from the side surface of the image forming apparatus toward the target display portion of the communication device, the operation is not hindered by an obstacle such as a configurational projection from the image forming apparatus, improvement of the operativity is realized. Further, in the case where the access direction to the operating portion is from substantially above the image forming apparatus, the device-to-be-authenticated has access to the target display portion in a direction different from the access direction to the operating portion, so that erroneous input to the operating portion is prevented.

Even when in order to improve the operativity of the image forming apparatus, the display portion of the operating portion becomes a large size and thus the operating portion itself becomes large, the target display portion is disposed on the outermost surface of at least one side surface of the apparatus main assembly excluding the operating portion. By this, the target display portion has no influence on an entire outer appearance excluding the operating portion.

The operating portion is disposed on the front side of the image forming apparatus, and the target display portion is provided at least one of a forward side (front side) of the left side surface toward the operating portion and a forward side (front side) of the right side surface toward the operating portion. By this the target display portion is provided within a range in which the user's hand operating the operating portion reaches, so that the operativity as a whole of the image forming apparatus is improved.

According to the above-described embodiment, it is possible to prevent an occurrence of misoperation when the user holds the mobile device over the communication device.

INDUSTRIAL APPLICABILITY

According to the present invention, an image forming apparatus in which contact, with the operating portion of the image forming apparatus, of the information terminal device held by the user over the operating portion is suppressed is provided.

EXPLANATION OF SYMBOLS

51 . . . IC card
52 . . . information terminal device
24, 122, 132, 142, 222,
111, 201 . . . image forming apparatus
121 . . . communication device
131 . . . IC card reader

The invention claimed is:
1. An image forming apparatus comprising:
an image forming portion configured to form an image on a recording medium;
a reading device provided above said image forming portion with respect to a vertical direction and configured to read an original;
an operating panel, provided on a front side of said image forming apparatus and provided adjacent to said reading device in a horizontal direction, and configured to receive input from a user;
a first target display portion which is provided adjacent to said operating panel and which is a target over which an IC card storing user information is to be held by the user;

an IC card reader configured to establish wireless communication with the IC card held over said first target display portion;

a second target display portion which is provided at a position distant from said operating panel more than said first target display portion is and which is a target over which an information terminal device is to be held by the user, provided on a face of a side wall of the image forming portion on the front side of said image forming apparatus; and a communication device configured to establish wireless communication with the information terminal device held over said second target display portion.

2. An image forming apparatus according to claim 1, wherein said second target display portion is provided at a portion connecting said reading device and said image forming portion.

3. An image forming apparatus according to claim 2, further comprising, a sheet feeding cassette provided below said image forming portion with respect to a vertical direction, and a sheet discharge portion provided between said reading device and said image forming portion and on which the recording material on which an image is formed by said image forming portion is discharged, wherein said second target display portion is provided on the front side of said image forming apparatus relative to a feeding path of a sheet fed from a sheet feeding cassette to said sheet discharge portion.

4. An image forming apparatus according to claim 1, further comprising an openable cover member provided on the front side of said image forming apparatus so that a cartridge which is included in said image forming portion and which includes a photosensitive drum is exchanged, wherein said second target display portion is provided on a surface adjacent to said cover member on an upper side with respect to the vertical direction.

5. An image forming apparatus according to claim 1, wherein said communication device is connected to the information terminal device through short range wireless communication.

6. An image forming apparatus according to claim 1, said communication device is connectable, through short range wireless communication, to the information terminal device in conformity with International standard ISO/IEC 18092, International standard ISO/IEC 21481, Wireless communication standard IEEE 802.11 or Wireless communication standard 802.15.1.

7. An image forming apparatus comprising:

an image forming portion configured to form an image on a recording medium;

a reading device provided above said image forming portion with respect to a vertical direction and configured to read an original, an operating panel, provided on a front side of said image forming apparatus and provided adjacent to said reading device in a horizontal direction, and configured to receive input from a user;

a first target display portion which is provided adjacent to said operating panel and which is a target over which an IC card storing user information is to be held by the user;

a second target display portion which is provided at a position more distant from said operating panel than said first target display portion is and which is a target over which an information terminal device is to be held by the user, provided on a face of a side wall of the image forming portion on the front side of said image forming apparatus;

a communication device configured to establish wireless communication with the information terminal device held over said second target display; and an IC card reader configured to establish wireless communication with the IC card held over said first target display portion;

wherein said second target display portion is provided on a side surface of a left side wall of the image forming portion disposed relative to the front side of said image forming apparatus.

8. An image forming apparatus according to claim 7, further comprising an openable cover member provided on the front side of said image forming apparatus so that a cartridge which is included in said image forming portion and which includes a photosensitive drum is exchanged, wherein said second target display portion is provided on a side surface of the image forming portion positioned between said cover member and said image reading portion with respect to the vertical direction.

9. An image forming apparatus according to claim 8, wherein said second target display portion is provided on the front side of said image forming apparatus than a central portion of said image forming apparatus in a direction from a rear side toward the front side of said image forming apparatus.

10. An image forming apparatus according to claim 7, wherein said communication device is connected to the information terminal device through short range wireless communication.

11. An image forming apparatus according to claim 7, wherein said communication device is connectable, through short range wireless communication, to the information terminal device in conformity with International standard ISO/IEC 18092, International standard ISO/IEC 21481, Wireless communication standard IEEE 802.11 or Wireless communication standard 802.15.1.

12. An image forming apparatus comprising:

an image forming portion configured to form an image on a recording medium;

a reading device provided above said image forming portion with respect to a vertical direction and configured to read an original, an operating panel, provided on a front side of said image forming apparatus and provided adjacent to said reading device in a horizontal direction, and configured to receive input from a user;

a first target display portion which is provided adjacent to said operating panel and which is a target over which an IC card storing user information is to be held by the user;

a second target display portion which is provided at a position more distant from said operating panel than said first target display portion is and which is a target over which an information terminal device is to be held by the user, provided on a face of a side wall of the image forming portion on the front side of said image forming apparatus;

a communication device configured to establish wireless communication with the information terminal device held over said second target display; and an IC card reader configured to establish wireless communication with the IC card held over said first target display portion, wherein said second target display portion is provided on a side surface of a right side wall of the image forming portion disposed relative to the surface of said image forming apparatus.

13. An image forming apparatus according to claim 12, further comprising an openable cover member provided on the front side of said image forming apparatus so that a cartridge which is included in said image forming portion and which includes a photosensitive drum is exchanged,
wherein said second target display portion is provided on a side surface of the image forming portion positioned between said cover member and said image reading portion with respect to the vertical direction.

14. An image forming apparatus according to claim 13, wherein said second target display portion is provided on the front side of said image forming portion than a central portion of said image forming portion in a direction from a rear side toward the front side of said image forming portion.

15. An image forming apparatus according to any one of claim 12, wherein said communication device is connected to the information terminal device through short range wireless communication.

16. An image forming apparatus according to claim 12, wherein said communication device is connectable, through short range wireless communication, to the information terminal device in conformity with International standard ISO/IEC 18092, International standard ISO/IEC 21481, Wireless communication standard IEEE 802.11 or Wireless communication standard 802.15.1.

* * * * *